United States Patent
Kim et al.

(10) Patent No.: US 10,735,237 B2
(45) Date of Patent: Aug. 4, 2020

(54) APPARATUS AND METHOD FOR GENERATING AND DETECTING PREAMBLE SYMBOL

(71) Applicant: SAMSUNG ELECTRONICS CO., LTD., Suwon-si (KR)

(72) Inventors: Min-ho Kim, Hwaseong-si (KR); Jung-hyun Park, Hwaseong-si (KR); Nam-hyun Kim, Suwon-si (KR); Joon-young Lee, Seoul (KR); Jin-joo Chung, Uiwang-si (KR); Doo-chan Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 55 days.

(21) Appl. No.: 16/021,609

(22) Filed: Jun. 28, 2018

(65) Prior Publication Data

US 2019/0097856 A1 Mar. 28, 2019

(30) Foreign Application Priority Data

Sep. 26, 2017 (KR) .................. 10-2017-0124533

(51) Int. Cl.
*H04L 27/26* (2006.01)

(52) U.S. Cl.
CPC ........ *H04L 27/263* (2013.01); *H04L 27/2605* (2013.01); *H04L 27/2607* (2013.01);
(Continued)

(58) Field of Classification Search
CPC ............... H04L 27/263; H04L 27/2605; H04L 27/2607; H04L 27/2663; H04L 27/2678; H04L 27/2613
See application file for complete search history.

(56) References Cited

U.S. PATENT DOCUMENTS

2007/0165728 A1 7/2007 Parizhsky et al.
2013/0272198 A1* 10/2013 Azizi .................. H04W 72/02
370/328

(Continued)

FOREIGN PATENT DOCUMENTS

EP 2981039 A1 2/2016
WO 2011/096766 A2 8/2011

OTHER PUBLICATIONS

"Part 11: Wireless LAN Medium Access Control (MAC) and Physical Layer (PHY) Specifications, Amendment 4: Enhancements for Very High Throughput for Operation in Bands below 6 GHz", IEEE Standards Association, IEEE Std 802.11ac, IEEE, Dec. 2013, 425 pages.

(Continued)

*Primary Examiner* — Maharishi V Khirodhar
*Assistant Examiner* — Kenneth P Hunt
(74) *Attorney, Agent, or Firm* — Sughrue Mion, PLLC

(57) ABSTRACT

A method and apparatus for generating a preamble symbol in an Orthogonal Frequency Division Multiplexing (OFDM) system by generating a first main body sequence in a time domain by performing an inverse fast Fourier transform (IFFT) on a preset sequence in a frequency domain, generating a first postfix by copying samples in a preset section in the first main body sequence, generating a first prefix by copying samples in at least a portion of a section remaining by excluding the preset section from the first main body sequence, and generating a plurality of symbols, based on a combination of the first main body sequence, the first prefix, and the first postfix.

18 Claims, 10 Drawing Sheets

(52) U.S. Cl.
CPC ...... *H04L 27/2613* (2013.01); *H04L 27/2663* (2013.01); *H04L 27/2678* (2013.01)

(56) References Cited

U.S. PATENT DOCUMENTS

| | | | |
|---|---|---|---|
| 2014/0229803 A1* | 8/2014 | Hong | ............ H04L 69/16 714/776 |
| 2016/0142237 A1 | 5/2016 | Atungsiri | |
| 2017/0171851 A1 | 6/2017 | Lan et al. | |
| 2017/0187557 A1 | 6/2017 | Zhang et al. | |
| 2017/0195155 A1* | 7/2017 | Zhang | ............ H04L 5/0007 |
| 2017/0245231 A1 | 8/2017 | Huang et al. | |

OTHER PUBLICATIONS

Kun-Wah Yip et al., "Timing-Synchronization Analysis for IEEE 802.11a Wireless LANs in Frequency-Nonselective Rician Fading Environment", IEEE Transactions on Wireless Communications, vol. 3, No. 2, IEEE, Mar. 2004, pp. 387-394.

"Physical Layer Protocol", ATSC Standard, Advanced Television Systems Committee, A/322:2017, Jun. 6, 2017, 262 pages.

Dazhi He et al., "System Discovery and Signaling Transmission Using Bootstrap in ATSC 3.0", IEEE Transactions on Broadcasting, vol. 62, No. 1, IEEE, Mar. 2016, pp. 172-180.

Daji Qiao et al., "Goodput Analysis and Link Adaptation for IEEE 802.11a Wireless LANs", IEEE Transactions on Mobile Computing, vol. 1, No. 4, IEEE, Dec. 2002, pp. 278-292.

"System Discovery and Signaling", ATSC Standard, Advanced Television Systems Committee, A/321:2016, Mar. 23, 2016, pp. 1-28.

Search Report dated Oct. 2, 2018, issued by the International Searching Authority in counterpart International Patent Application No. PCT/KR2018/007076 (PCT/ISA/210).

Written Opinion dated Oct. 2, 2018, issued by the International Searching Authority in counterpart International Patent Application No. PCT/KR2018/007076 (PCT/ISA/237).

* cited by examiner

US 10,735,237 B2

APPARATUS AND METHOD FOR GENERATING AND DETECTING PREAMBLE SYMBOL

CROSS-REFERENCE TO RELATED APPLICATION(S)

This application is based on and claims priority under 35 U.S.C. § 119 to Korean Patent Application No. 10-2017-0124533, filed on Sep. 26, 2017, in the Korean Intellectual Property Office, the disclosure of which is incorporated by reference herein in its entirety.

BACKGROUND

1. Field

The disclosure relates to apparatuses and methods of generating and detecting a preamble symbol, and more particularly, to apparatuses and methods of generating and detecting a preamble symbol, which are robust to distortion.

2. Description of Related Art

An Orthogonal Frequency Division Multiplexing (OFDM)-based communication system transforms a data stream input in series to a plurality of parallel data streams and simultaneously transmits the plurality of parallel data streams by carrying the plurality of parallel data streams on a plurality of sub-carriers having mutual orthogonality. By doing this, data transmission may be increased, and a symbol interval may be wider than that of a single carrier signal, and thus interference between adjacent symbols may be reduced, thereby enabling reliable demodulation even in a multi-path channel. In this case, time and frequency synchronization is required to accurately demodulate a signal transmitted from an OFDM-based transmission device.

The OFDM-based communication system performs initial synchronization for detecting a start time point of a frame and symbol synchronization for detecting a start position of a symbol, by using a correlation between a received signal and a signal (e.g., a phase reference symbol) obtained in advance by a reception device to detect time synchronization.

However, for transmission of an audio/video (AV) stream in the OFDM-based communication system, data transmission efficiency for bulk data transmission and robustness of a transmission and reception network have to be guaranteed.

SUMMARY

Provided are apparatuses and methods of generating and detecting a preamble symbol, which are robust to distortion Provided a non-transitory computer-readable recording medium having recorded thereon a computer-readable program for executing the methods.

Additional aspects will be set forth in part in the description which follows and, in part, will be apparent from the description, or may be learned by practice of the presented embodiments.

In accordance with an aspect of the disclosure, a preamble symbol generation method includes: generating a first main body sequence in a time domain by performing an inverse fast Fourier transform (IFFT) on a preset sequence in a frequency domain; generating a first postfix by copying samples in a preset section in the first main body sequence; generating a first prefix by copying samples in at least a portion of a section remaining by excluding the preset section from the first main body sequence; and generating a plurality of symbols, based on a combination of the first main body sequence, the first prefix, and the first postfix.

The preset section may correspond to a section from an initial point of the first main body sequence to a preset point of the first main body sequence.

A length of the first main body sequence and a sum of a length of the first prefix and a length of the first postfix may be same.

The plurality of symbols may include a first symbol, a second symbol, and a third symbol, the first symbol may include the first main body sequence and the second symbol may include the first main body sequence, and the third symbol may include a second main body sequence that is different from the first main body sequence.

A sequence of the first symbol may be configured in an order of the first prefix, the first main body sequence, and the first postfix, a sequence of the second symbol may be configured in an order of the first postfix, the first prefix, and the first main body sequence, a sequence of the third symbol may be configured in an order of a second prefix, the second main body sequence, and a second postfix, and a length of the second prefix, a length of the second main body sequence, and a length of the second postfix may respectively correspond to the length of the first prefix, the length of the first main body sequence, and the length of the first postfix.

A length of the first main body sequence may correspond to a 128-fast Fourier transform (FFT) size.

The plurality of symbols may include a training symbol in which a plurality of sample signals are repeated.

In accordance with another aspect of the disclosure, a method of detecting a preamble symbol in an Orthogonal Frequency Division Multiplexing (OFDM) system includes: receiving a preamble including a plurality of symbols generated based on a combination of a first main body sequence, a first prefix, and a first postfix; generating delayed sequences by sequentially delaying a sequence of the received preamble; calculating correlation values by mutually correlating the sequence of the received preamble and the delayed sequences; and detecting a location of the plurality of symbols, based on the correlation values, wherein the first postfix corresponds to samples in a preset section in the first main body sequence, and the first prefix corresponds to samples in at least a portion of a section remaining by excluding the preset section from the first main body sequence.

The preset section may correspond to a section from an initial point of the first main body sequence to a preset point of the first main body sequence.

The generating the delayed sequences may include: generating a first delayed sequence by delaying the sequence of the received preamble by a length of the first main body sequence; generating a second delayed sequence by delaying the sequence of the received preamble by a sum of the length of the first main body sequence and a length of the first postfix; and generating a third delayed sequence by delaying the sequence of the received preamble by a length of the first postfix.

The calculating the correlation values may include calculating a plurality of correlation values by complex-conjugate-calculating each of the first delayed sequence, the second delayed sequence, and the third delayed sequence with the sequence of the received preamble and then applying a running average filter to a result of the complex-conjugate-calculating.

The detecting the location of the plurality of symbols may include: forming a maximum correlation peak by performing delayed summation on the plurality of correlation values; detecting an initial point of a frame from a time point where the maximum correlation peak exceeds a preset threshold; and detecting the location of the plurality of symbols from a location of the maximum correlation peak.

The plurality of symbols may include a first symbol, a second symbol, and a third symbol, the first symbol may include the first main body sequence and the second symbol may include the first main body sequence, and the third symbol may include a second main body sequence that is different from the first main body sequence.

A sequence of the first symbol may be configured in an order of the first prefix, the first main body sequence, and the first postfix, a sequence of the second symbol may be configured in an order of the first postfix, the first prefix, and the first main body sequence, a sequence of the third symbol may be configured in an order of a second prefix, the second main body sequence, and a second postfix, and a length of the second prefix, a length of the second main body sequence, and a length of the second postfix may respectively correspond to a length of the first prefix, a length of the first main body sequence, and a length of the first postfix.

In accordance with another aspect of the disclosure, an apparatus for generating a preamble symbol in an Orthogonal Frequency Division Multiplexing (OFDM) system includes: a main body sequence generator configured to generate a first main body sequence in a time domain by performing an inverse fast Fourier transform (IFFT) on a preset sequence in a frequency domain; and a symbol generator configured to generate a first postfix by copying samples in a preset section in the first main body sequence, generate a first prefix by copying samples in at least a portion of a section remaining by excluding the preset section from the first main body sequence, and generate a plurality of symbols, based on a combination of the first main body sequence, the first prefix, and the first postfix.

The preset section may correspond to a section from an initial point of the first main body sequence to a preset point of the first main body sequence.

In accordance with another aspect of the disclosure, an apparatus for detecting a preamble symbol in an Orthogonal Frequency Division Multiplexing (OFDM) system includes: a receiver configured to receive a preamble including a plurality of symbols generated based on a combination of a first main body sequence, a first prefix, and a first postfix; a delay configured to generate delayed sequences by sequentially delaying a sequence of the received preamble; and a detector configured to calculate correlation values by mutually correlating the sequence of the received preamble and the delayed sequences and detect a location of the plurality of symbols, based on the correlation values, wherein the first postfix corresponds to samples in a preset section in the first main body sequence, and the first prefix corresponds to samples in at least a portion of a section remaining by excluding the preset section from the first main body sequence.

The preset section may correspond to a section from an initial point of the first main body sequence to a preset point of the first main body sequence.

In accordance with another aspect of the disclosure, a non-transitory computer-readable recording medium includes a recording medium having recorded thereon a program, which when executed by a computer, performs the method.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
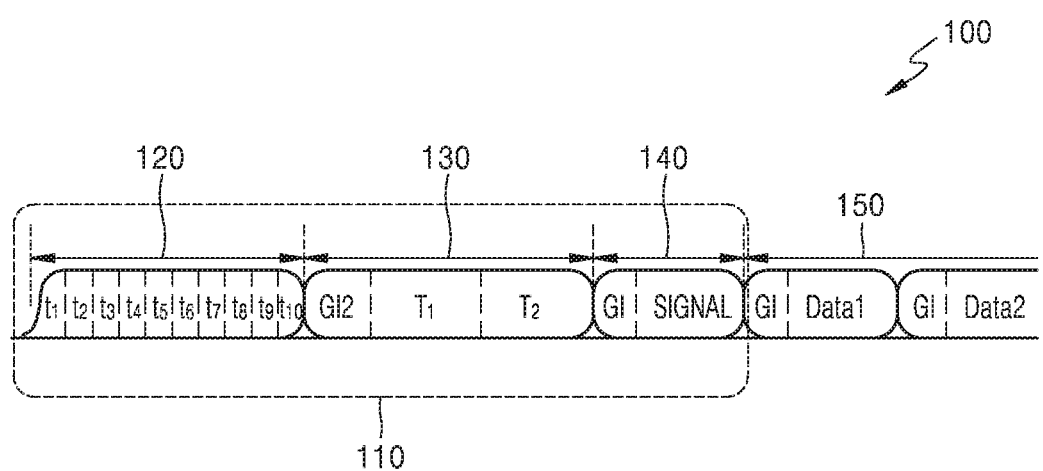
FIG. 1 illustrates a preamble structure of a wireless local area network (LAN) communication system.

The terms used in this disclosure are those general terms currently widely used in the art, but the terms may vary according to the intention of those of ordinary skill in the art, precedents, or new technology in the art. Also, specified terms may be selected by the applicant, and in this case, the detailed meaning thereof will be described in the detailed description. Thus, the terms used in the disclosure should be understood not as simple names but based on the meaning of the terms and the overall description.

Throughout the specification, it will also be understood that when a component "includes" an element, unless there is another opposite description thereto, it should be understood that the component does not exclude another element but may further include another element. In addition, terms such as " . . . unit", " . . . module", or the like refer to units that perform at least one function or operation, and the units may be implemented as hardware or software or as a combination of hardware and software.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items.

Hereinafter, embodiments of the present disclosure will be described in detail with reference to the accompanying drawings.

FIG. 1 illustrates a preamble structure of a wireless local area network (LAN) communication system.

The wireless LAN communication system related to an embodiment includes a set of stations capable of communicating with each other through synchronization. In this case, the communication between stations may be Wi-Fi communication based on the Institute of Electrical and Electronics Engineers (IEEE) 802.11a/b/g/n/ac standards using a 2.4-GHz/5-GHz unlicensed band.

A station in the wireless LAN communication system indicates a logical entity including a medium access control (MAC) interface and a physical layer interface for a wireless medium and may include an access point and a non-access point. The access point is an entity that provides, to the station, an access to a distribution system through a wireless medium. The access point may be called a centralized controller, a base station, a Node-B, a base transceiver system (BTS), a site controller, or the like. The non-access point may be called a terminal, a wireless transmission/reception unit, user equipment, a mobile station, a mobile terminal, a mobile subscriber unit, or the like.

A structure of a preamble 110 of a frame (or packet) 100 used in communication of the wireless LAN communication system will now be described.

The frame 100 of the wireless LAN communication system includes the preamble 110. The preamble 110 is located at a head portion of the frame 100 and may be used to successfully detect a signal distorted by a wireless channel and perform synchronization.

The preamble 110 sequentially includes a short training field (STF) 120, a long training field (LTF) 130, and a signal field 140. A data portion 150 may be located in the frame 100 by following the preamble 110.

Each of the STF 120, the LTF 130, and the signal field 140 may include integer times of at least one orthogonal frequency-division multiplexing (OFDM) symbol.

The STF 120 may have a structure in which t consisting of 32 samples is repeated 10 times, where t may be configured by inserting an agreed sequence at four-sample intervals in a frequency domain and then performing a fast Fourier transform (FFT) to obtain 32 repeated samples.

The LTF 130 has a structure in which T consisting of 128 samples is repeated two times, and a guard interval (GI) of a 32-sample length may be inserted into a head of the LTF 130. The GI is used to guarantee orthogonality of OFDM in a reception device (e.g., a client station or an access point) and minimize or cancel interference between symbols due to multi-path propagation in a communication channel on which OFDM symbols are transmitted.

The signal field 140 may have a 144-sample length and include formatting information for decoding the data portion 150.

A total length of the preamble 110 including the STF 120, the LTF 130, and the signal field 140 may be 784 samples. This length of the preamble 110 is relatively shorter than a length of a preamble used in a broadcasting system.

The preamble 110 may be transmitted and received in a communication system based on IEEE 802.11a/b/g/n/ac standards using a 2.4-GHz/5-GHz unlicensed band. Generally, a Wi-Fi communication system using the 2.4-GHz/5-GHz band aims at bidirectional communication in a mobile environment, and a packet of which transmission has failed may be restored through five to seven retransmissions. Therefore, a signal detection performance requirement of the preamble 110 is not relatively high, and a decodable signal to noise ratio (SNR) of most robust data may be limited according to the signal detection performance requirement of the preamble 110.

However, in a scenario for transmitting an audio video (AV) stream, low latency and seamless data transmission are necessary, and thus a more robust communication system than a retransmission-based communication system is required. That is, to successfully transmit and receive the entirety of the frame 100, it is needed to first transmit and receive the preamble 110 robust to distortion.

A structure of the preamble 110 robust to distortion may be conceived from a preamble structure of a broadcasting system. For example, the broadcasting system aims at uni-directional communication in a static environment, and thus it tends to be designed so as to guarantee data at a very high success rate without retransmission. Hereinafter, a preamble structure of an Advanced Television Systems Committee (ATSC) 3.0 broadcasting system will be described.

Figure 2:
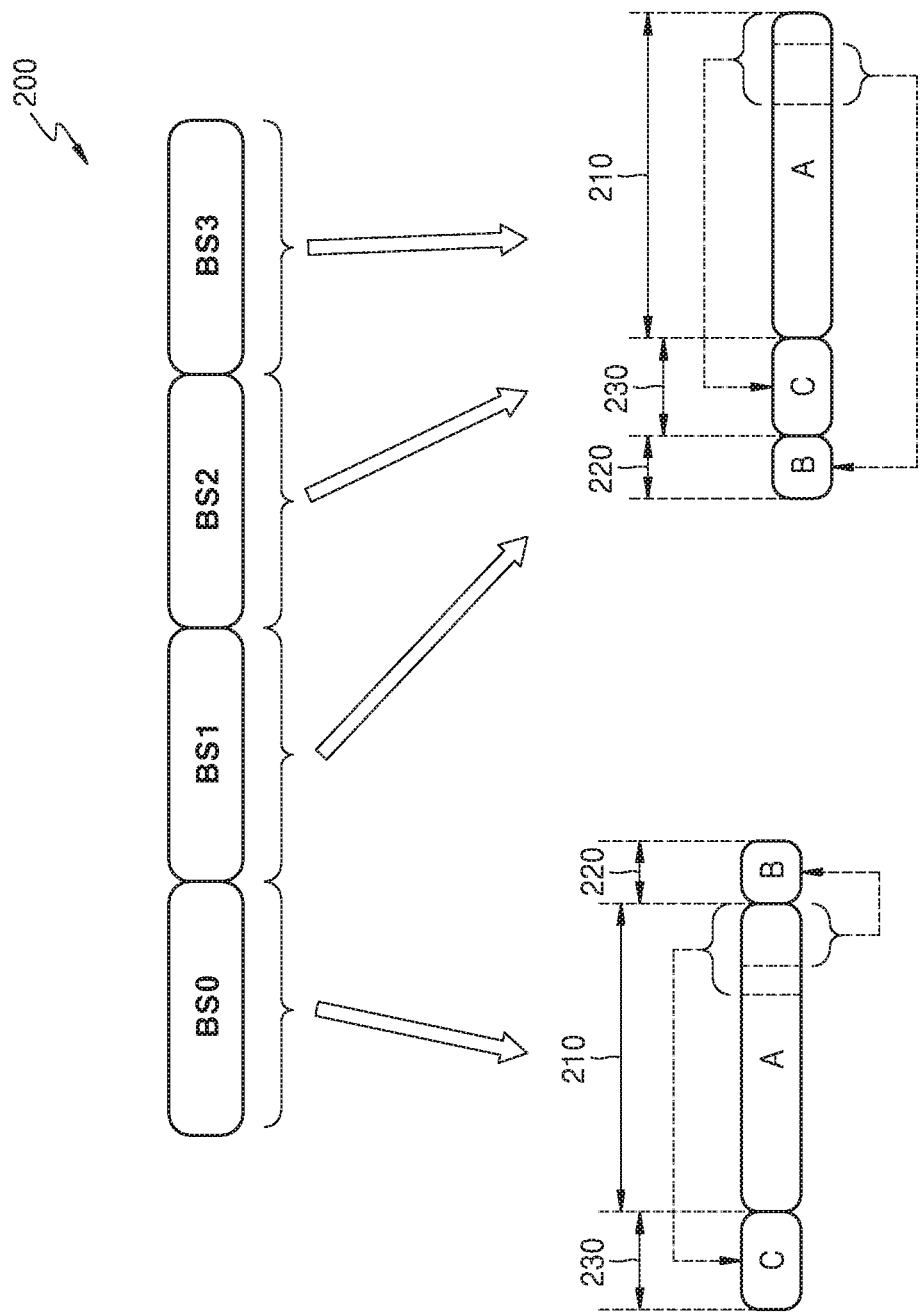
FIG. 2 illustrates a preamble structure of an Advanced Television Systems Committee (ATSC) 3.0 broadcasting system.

FIG. 2 illustrates a preamble structure of an ATSC 3.0 broadcasting system.

ATSC 3.0 is a digital TV broadcasting standard enabling multi-channel broadcasting and a bidirectional service and is a protocol enabling high image quality image data transmission at a high speed by using an Internet protocol (IP).

Referring to FIG. 2, a preamble 200 of a frame used in the ATSC 3.0 broadcasting system is shown. The preamble 200 may include one or more bootstraps. For example, the preamble 200 may include bootstraps BS0, BS1, BS2, and BS3.

In this case, each bootstrap includes OFDM symbols, and an FFT size of OFDM symbols constituting each bootstrap may be equally 2048.

Referring to FIG. 2, each bootstrap includes a symbol A 210, a symbol B 220, and a symbol C 230. The symbol A 210 is a main body constituting each bootstrap, and the symbol B 220 and the symbol C 230 are symbols copied from a portion of the symbol A 210.

In a structure of the preamble 200 of the ATSC 3.0 broadcasting system, the symbol B 220 and the symbol C 230 may correspond to samples at a tail portion of the symbol A 210. In this case, the bootstrap BS0 of the preamble 200 may have a structure of symbols C-A-B, and the bootstraps BS1, BS2, and BS3 of the preamble 200 may have a structure of symbols B-C-A.

The symbol A 210 of each bootstrap may be acquired by inserting an agreed sequence in the frequency domain and then performing FFT. For signal detection and synchronization, the same sequence may be always inserted into the bootstrap BS0, and for signaling information transmission and the like, different sequences may be inserted into the bootstraps BS1, BS2, and BS3.

In the ATSC 3.0 broadcasting system, a symbol length of each bootstrap may be 3,072 samples, and a total length of the preamble 200 may be 12,288 samples. That is, the length of the preamble 200 of the ATSC 3.0 broadcasting system is relatively longer than the length of the preamble 110 of the wireless LAN communication system which has been described with reference to FIG. 1.

Through the above-described structure of the preamble 200, the ATSC 3.0 broadcasting system may guarantee data transmission and reception at a very high success rate without retransmission. The ATSC 3.0 broadcasting system may be suitable for a communication system for AV stream transmission. However, when a design structure of the preamble 200 of the ATSC 3.0 broadcasting system is applied to a 2.4-GHz/5-GHz band communication system without modification, the length of the preamble 200 is too long, and thus a processing delay may occur, and complexity of a receiver may be increased. Therefore, the use of the design structure of the preamble 200 of the ATSC 3.0 broadcasting system in the 2.4-GHz/5-GHz band communication system without modification may cause an increase in costs.

The present disclosure proposes a novel preamble structure applicable to a communication system for transmission of an AV stream in a 2.4-GHz/5-GHz band and a configuration of a receiver capable of receiving a preamble of this novel structure. According to an embodiment, more robust signal detection performance than preamble signal detection performance in a general Wi-Fi communication system is achieved, and even in a low SNR area, seamless data transmission without retransmission is possible.

Figure 3:
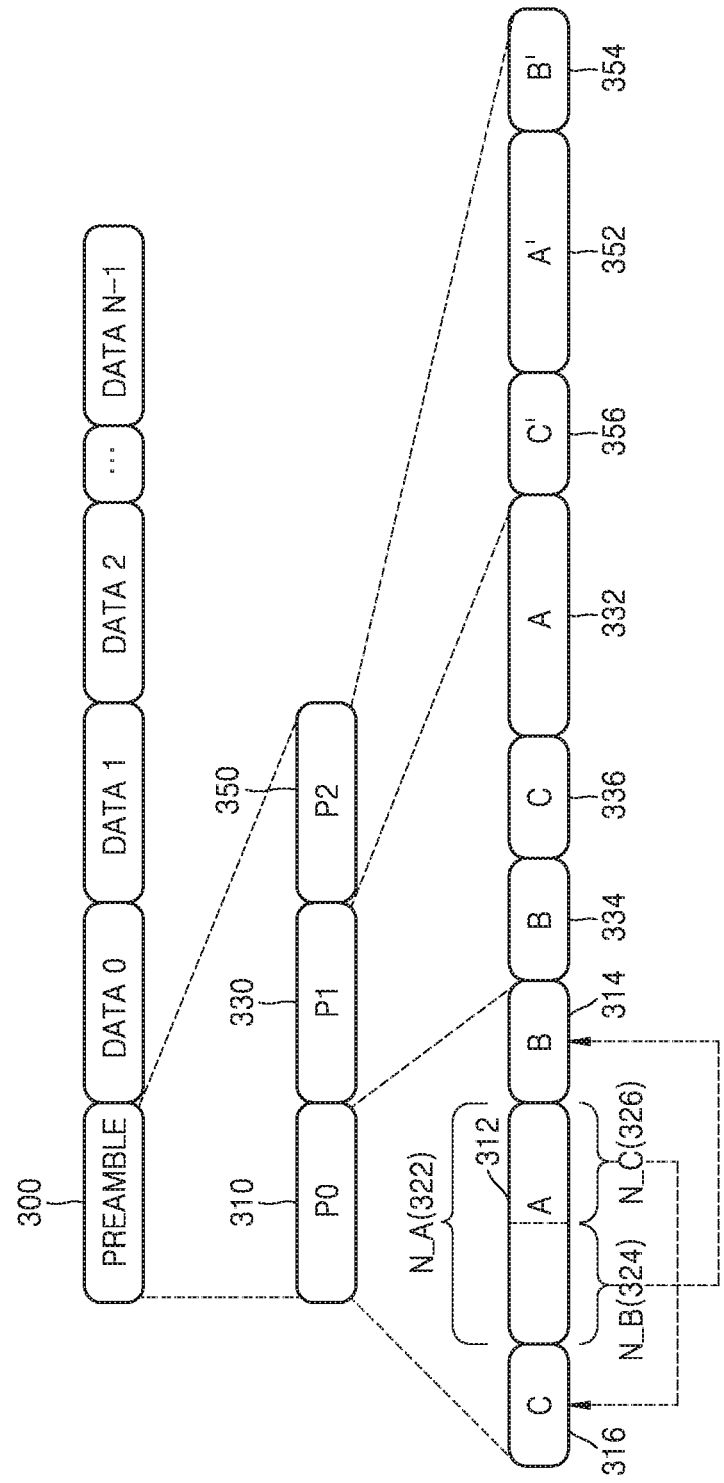
FIG. 3 illustrates a preamble structure according to an embodiment.

FIG. 3 illustrates a preamble structure according to an embodiment.

Referring to FIG. 3, a structure of a preamble 300 usable in a communication system for transmission of an AV stream is shown. The preamble 300 may constitute one packet together with a plurality of data symbols.

According to an embodiment, the preamble 300 includes one or more OFDM symbols. For example, the preamble 300 may include a symbol P0 310, a symbol P1 330, and a symbol P2 350. In this case, an internal sequence structure of each of the symbols P0 310, P1 330, and P2 350 may be different from each other as described below.

According to an embodiment, each of the symbols P0 310, P1 330, and P2 350 may consist of a set of a plurality of symbols. According to an embodiment, the symbols P0 310, P1 330, and P2 350 may commonly include a main body sequence. In an embodiment, the main body sequence may be a first main body sequence and/or a second main body sequence. For example, the first main body sequence may be represented as a symbol A and the second main body sequence may be represented as a symbol A'. In this case, the symbol A' may be a symbol of a sequence different from that of the symbol A.

According to an embodiment, the symbol P0 310 may include a symbol A 312 that is a main body sequence, a symbol B 314 that is a postfix (or a cyclic postfix), and a symbol C 316 that is a prefix (or a cyclic prefix). In an embodiment, the symbol A 312 may be a first main body sequence, the symbol B 314 may be a first postfix, and the symbol C 316 may be a first prefix.

According to an embodiment, the symbol A 312 is generated by performing an inverse FFT (IFFT) on a preset sequence in the frequency domain to convert the preset sequence into a time domain. According to an embodiment, a sample length of the symbol A 312 may be represented as N_A 322. For example, N_A 322 may have a 128 FFT size based on a 40-MHz bandwidth. A detailed method of generating the symbol A 312 will be described below with reference to FIG. 4.

According to an embodiment, the symbol B 314 may be copied from samples in a first section in the symbol A 312. In this case, the first section may be preset and may correspond to samples corresponding to a head portion of the symbol A 312. For example, the symbol B 314 may be copied from samples corresponding to a section from an initial point of the symbol A 312 to a certain point (e.g., preset point) of the symbol A 312. According to an embodiment, a sample length of the symbol B 314 copied from the symbol A 312 may be represented as N_B 324. For example, N_B 324 may have 56 samples.

According to an embodiment, the symbol C 316 may be copied from samples in a second section in the symbol A 312. In this case, the second section may indicate at least a portion of a section remaining by excluding the section corresponding to the symbol B 314 from the symbol A 312. For example, the symbol C 316 may correspond to samples corresponding to a tail portion of the symbol A 312. In other words, the symbol C 316 may be copied from samples corresponding to a section from the certain point of the symbol A 312 to an end point of the symbol A 312. According to an embodiment, a sample length of the symbol C 316 copied from the symbol A 312 may be represented as N_C 326. For example, N_C 326 may have 72 samples.

According to an embodiment, a sum of a length of the symbol B 314 and a length of the symbol C 316 may be the same as a length of the symbol A 312. In other words, a sum of the N_B 324 and the N_C 326 may be the same as the N_A 322. In this case, based on the certain point of the symbol A 312, the section corresponding to the head portion of the symbol A 312 may correspond to the symbol B 314, and the section corresponding to the tail portion of the symbol A 312 may correspond to the symbol C 316. However, a relationship among the length of the symbol A 312, the length of the symbol B 314, and the length of the symbol C 316 is not limited to the embodiment described above and may exist in various combination forms. For example, According to another embodiment, the sum of the lengths of the symbol B 314 and the symbol C 316, which are copied from a portion of the symbol A 312, may be longer than the length of the symbol A 312. According to another embodiment, the sum of the lengths of the symbol B 314 and the symbol C 316, which are copied from a portion of the symbol A 312, may be less than the length of the symbol A 312. In other words, an end point of the section corresponding to the symbol B 314 in the symbol A 312 does not have to match an initial point of the section corresponding to the symbol C 316 in the symbol A 312.

However, it may be preferable that a sample length of the symbol B 314 compared with a sample length of the symbol A 312 and a sample length of the symbol C 316 compared with the sample length of the symbol A 312 are set large to improve a correlation gain at a preamble symbol reception side. Therefore, according to an embodiment, for a preamble symbol, a value of N_B/N_A and a value of N_C/N_A may be set large.

According to an embodiment, a sequence structure of the symbol P0 310 may be configured in an order of the symbol C 316 that is a prefix, the symbol A 312 that is a main body sequence, and the symbol B 314 that is a postfix.

According to an embodiment, the symbol P1 330 may include a symbol A 332, a symbol B 334, and a symbol C 336. In this case, the symbol A 332, the symbol B 334, and the symbol C 336 in the symbol P1 330 may correspond to the symbol A 312, the symbol B 314, and the symbol C 316 in the symbol P0 310, respectively. That is, according to an embodiment, the same sequence as the sequence of the symbol A 312 in the symbol P0 310 may be inserted into the symbol A 332 in the symbol P1 330.

According to an embodiment, a sequence structure of the symbol P1 330 may be configured in an order of the symbol B 334, the symbol C 336, and the symbol A 332.

According to an embodiment, the symbol P2 350 may include a symbol A' 352 that is a main body sequence, a symbol B' 354, and a symbol C' 356. In an embodiment, the symbol A' 352 may be a second main body sequence, the symbol B' 354 may be a second postfix, and the symbol C' 356 may be a second prefix. In this case, the symbol A' 352 in the symbol P2 350 may not be the same as the symbol A 312 in the symbol P0 310. That is, the symbol A' 352 may be a sequence structure similar to or different from that of the symbol A 312.

According to an embodiment, by making the main body sequence (i.e., the symbol A' 352) of the symbol P2 350 different from the main body sequence (i.e., the symbol A 312) of the symbol P0 310, additional signaling information may be transmitted while maintaining the signal detection and synchronization performance. According to an embodiment, the symbol A' 352 is different from the symbol A 312, and thus the symbol B' 354 and the symbol C' 356 may also be different from the symbol B 314 and the symbol C 316, respectively. However, a process of generating the symbol B' 354 and the symbol C' 356 of the symbol P2 350 by copying a portion of the symbol A' 352 may be the same as a process of generating the symbol A 312 or 332, the symbol B 314 or 334, and the symbol C 316 or 336 of the symbol P0 310 or P1 330. Therefore, a length of the symbol A' 352, a length of the symbol B' 354, and a length of the symbol C' 356 may be the same as a length of the symbol A 312 or 332, a length of the symbol B 314 or 334, and a length of the symbol C 316 or 336, respectively.

According to an embodiment, a sequence structure of the symbol P2 350 may be configured in an order of the symbol C' 356, the symbol A' 352, and the symbol B' 354.

As described above, an internal sequence structure of each of the symbol P0 310, the symbol P1 330, and the symbol P2 350 according to an embodiment has been described. According to an embodiment, the symbol P0 310 and the symbol P2 350 may have similar C-A-B structure, and the symbol P1 330 may have a B-C-A structure. In addition, according to an embodiment, the main body sequences of the symbol P0 310 and the symbol P1 330 are the same as each other, but the main body sequences of the symbol P0 310 and the symbol P2 350 may be different from each other. An aspect that the preamble symbol structure described above contributes to improvement of the signal detection and synchronization performance will be described in detail below with reference to FIGS. 5 to 7.

Figure 4:
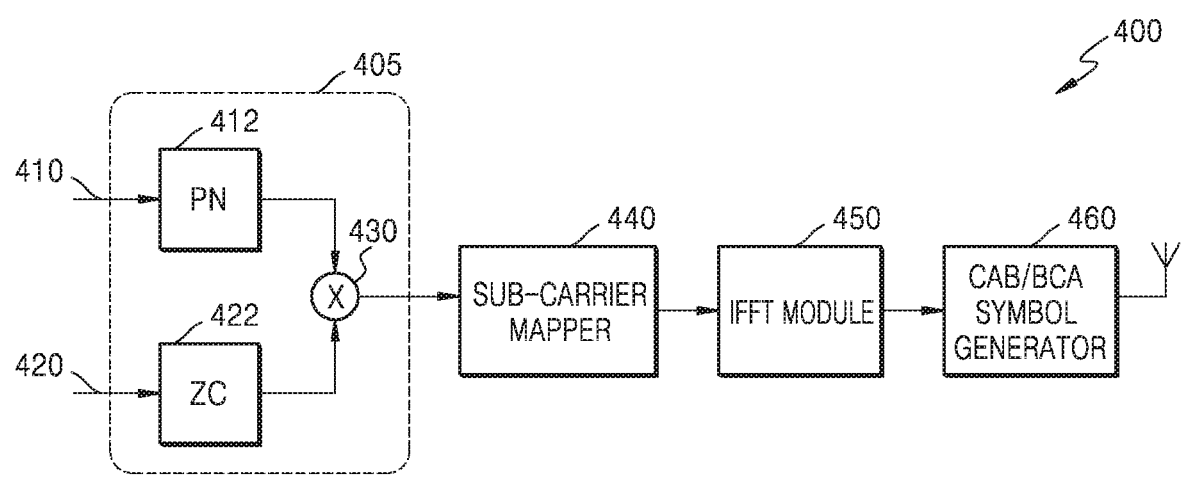
FIG. 4 is a block diagram of a method by which a preamble symbol generation apparatus generates a preamble symbol, according to an embodiment.

FIG. 4 is a block diagram of a method by which a preamble symbol generation apparatus 400 generates a preamble symbol, according to an embodiment.

As described above, a preamble includes OFDM symbols located at a portion where each frame starts, in order to enable service discovery, approximate time synchronization, frequency offset estimation, and initial channel estimation. In this case, the OFDM symbols may be generated based on a preset sequence in the frequency domain.

Referring to FIG. 4, the preamble symbol generation apparatus 400 includes a sequence generator 405. According to an embodiment, the sequence generator 405 may include a pseudo noise (PN) sequence generator 412 and a Zadoff-Chu (ZC) sequence generator 422. The sequence generator 405 may generate a signature sequence including a PN sequence generated by the PN sequence generator 412 and a ZC sequence generated by the ZC sequence generator 422. According to an embodiment, the PN sequence and the ZC sequence may be combined by a multiplier 430, and the combined sequence may be mapped to sub-carriers of an OFDM symbol by a sub-carrier mapper 440.

According to an embodiment, a seed value for the PN sequence generator 412 is supplied through a first input 410, and a second input 420 provides a root sign for the ZC sequence generator 422.

The PN sequence indicates a sequence exhibiting a characteristic similar to that of random noise but having a regular rule. Therefore, the PN sequence is frequently used for mobile communication of a spectrum spreading scheme. The PN sequence may be generated as a long-size sequence by the PN sequence generator 412 and may be used to quickly perform initial synchronization. That is, the PN sequence has a characteristic usable as an identifier. According to an embodiment, the PN sequence generator 412 may generate a PN sequence p(k) based on output values output by inputting a preset input value to a shift register and shifting the input value in the shift register at every clock. For example, the PN sequence generator 412 may generate a PN sequence by performing a calculation according to a preset primitive polynomial-based circuit with respect to the output values output from the shift register.

For the ZC sequence, a code having good auto-correlation and cross-correlation characteristics may be used. A ZC sequence implementation method may include a coordinate rotation digital computer (CORDIC) method suitable for hardware implementation, and the like. This calculation method may be implemented by quantizing sequences with precision required for a ZC sequence calculation, then storing obtained values in a memory, and using a lookup table and a bit shift calculation. A ZC sequence z(k) having a length $N_{ZC}$ is defined by Equation 1 below.

$$z(k) = e^{-j\pi q \frac{k(k+1)}{N_{ZC}}} \tag{1}$$

where q denotes a root index, $N_{ZC}$ denotes a length of a ZC sequence, and k denotes a positive number less than $N_{ZC}$ and determines a characteristic of the ZC sequence.

The ZC sequence defined by Equation 1 is used as a code which becomes a basis for a preamble and is converted to a signal in the frequency domain through a discrete Fourier transform.

According to an embodiment, the generated PN sequence and ZC sequence may be combined by the multiplier 430 and mapped to an OFDM sub-carrier in a manner of generating reflective symmetry with respect to a center direct current (DC) sub-carrier of an OFDM symbol.

According to an embodiment, an IFFT module 450 converts a signature frequency generated in the frequency domain into the time domain through an inverse Fourier transform. In this case, an initial symbol converted to the time domain may be denoted as "main body stream" or "symbol A".

According to an embodiment, a symbol generator 460 forms OFDM symbols in the time domain. As described above with reference to FIG. 3, it may be analyzed that each of OFDM symbols in a preamble consists of three parts denoted as A, B, and C. An OFDM symbol may be formed by copying a partial section of an OFDM symbol in the time domain in order to consider multi-path reception in a receiver. A preamble symbol may be formed in one of the various structures as described above. For example, the preamble symbol may have a C-A-B structure or a B-C-A structure.

According to an embodiment, the preamble symbol generation apparatus 400 may transmit the generated preamble symbol through an antenna.

Figure 5:
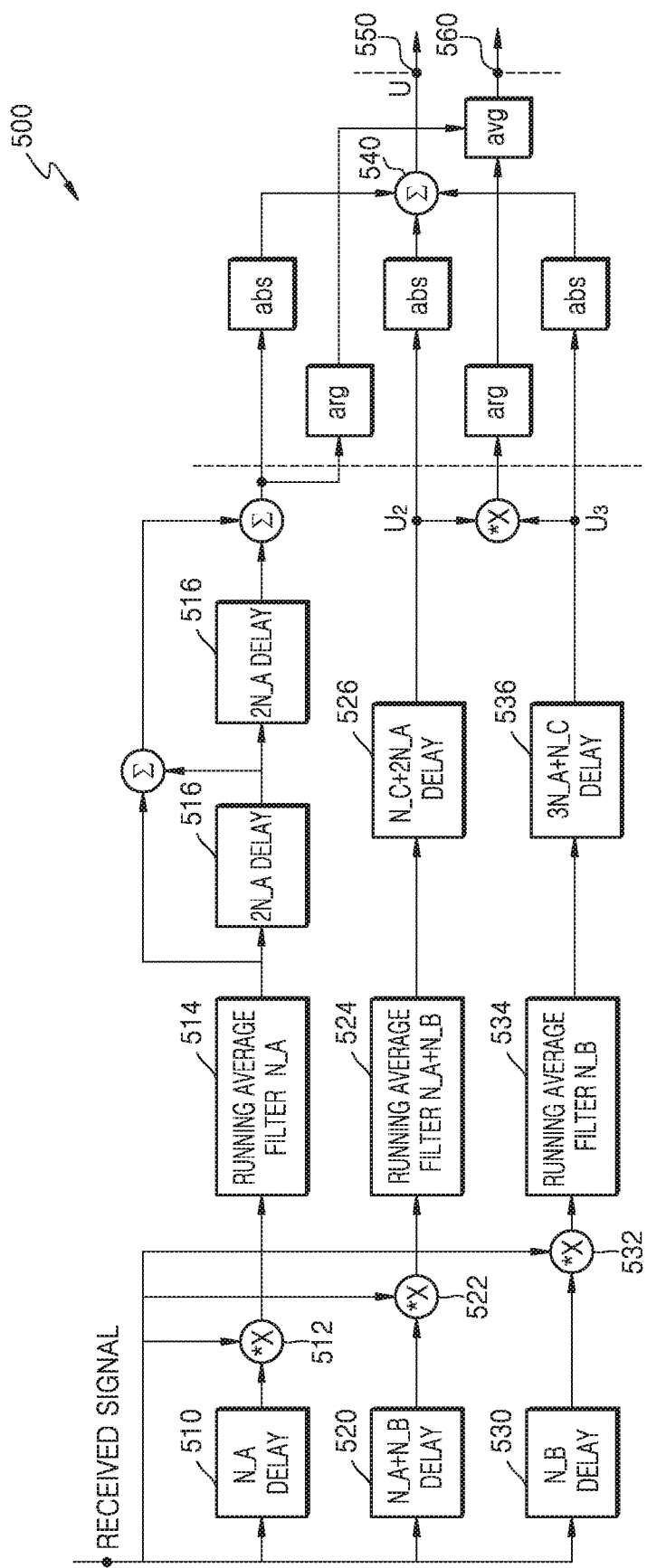
FIG. 5 is a block diagram of a method by which a preamble symbol detection apparatus detects a preamble symbol, according to an embodiment.

FIG. 5 is a block diagram of a method by which a preamble symbol detection apparatus 500 detects a preamble symbol, according to an embodiment.

According to an embodiment, the preamble symbol detection apparatus 500 may receive the preamble symbol generated by the preamble symbol generation apparatus 400.

According to an embodiment, a received preamble sequence may be supplied to each of three delay circuits 510, 520, and 530. In this case, the three delay circuits 510, 520, and 530 delay the preamble sequence by the numbers of samples corresponding to the lengths N_A, N_A+N_B, and N_B of the preamble symbol, respectively. According to an embodiment, a sequence delay may be achieved by shifting a frequency in correspondence to adjustment of the frequency supplied from a tone generation circuit.

According to an embodiment, the preamble symbol detection apparatus 500 may delay the preamble sequence by the numbers of samples corresponding to the lengths N_A, N_A+N_B, and N_B, respectively. Thereafter, the preamble symbol detection apparatus 500 may combine N_A, N_A+N_B, and N_B delayed sequences with a conjugated sample of the received preamble sequence by using multipliers 512, 522, and 532 to form correlations between the received preamble sequence and delayed sequences following the received preamble sequence.

According to an embodiment, the preamble symbol detection apparatus 500 may input outputs of the multipliers 512, 522, and 532 to running average filters 514, 524, and 534. In this case, the running average filters 514, 524, and 534 may be power normalization filters. As shown in FIG. 5, the running average filters 514, 524, and 534 are formed from respective delay elements N_A, N_A+N_B, and N_B. Outputs of the running average filters 514, 524, and 534 may form running average correlation values.

According to an embodiment, the outputs of the running average filters 514, 524, and 534 may be delayed by delay elements 516, 526, and 536, up-scaled by scaling elements, added by an adder 540, and output as an output 550. In this case, the adder 540 may output a peak-combined sample generated through mutual-correlation between the received preamble sequence and the delayed sequences. The peak-combined sample may indicate a maximum correlation peak obtained by performing delayed summation on a plurality of correlation values. In addition, a peak may be detected through the output 560, and an FFT trigger point may be identified according to the detected peak. Furthermore, through the output 550, a phase of the peak may be identified, and a fine frequency offset (FFO) may be determined. In addition, frequency synchronization may be performed by estimating a carrier frequency offset.

According to an embodiment, when the maximum correlation peak exceeds a preset threshold, the preamble symbol detection apparatus 500 may determine the maximum correlation peak as a start of a frame and determine, as an initial point of the frame, a time point where the maximum correlation peak exceeds the threshold. In addition, according to an embodiment, the preamble symbol detection apparatus 500 may detect an initial location of a plurality of OFDM symbols in the detected frame from a location of the maximum correlation peak.

As described above, according to an embodiment, the preamble symbol detection apparatus 500 may detect a location of a plurality of symbols based on correlation values obtained by mutually correlating a preamble sequence and delayed sequences. In this case, the detected plurality of symbols may conform to the preamble symbol structure described above with reference to FIG. 3.

Figure 6:
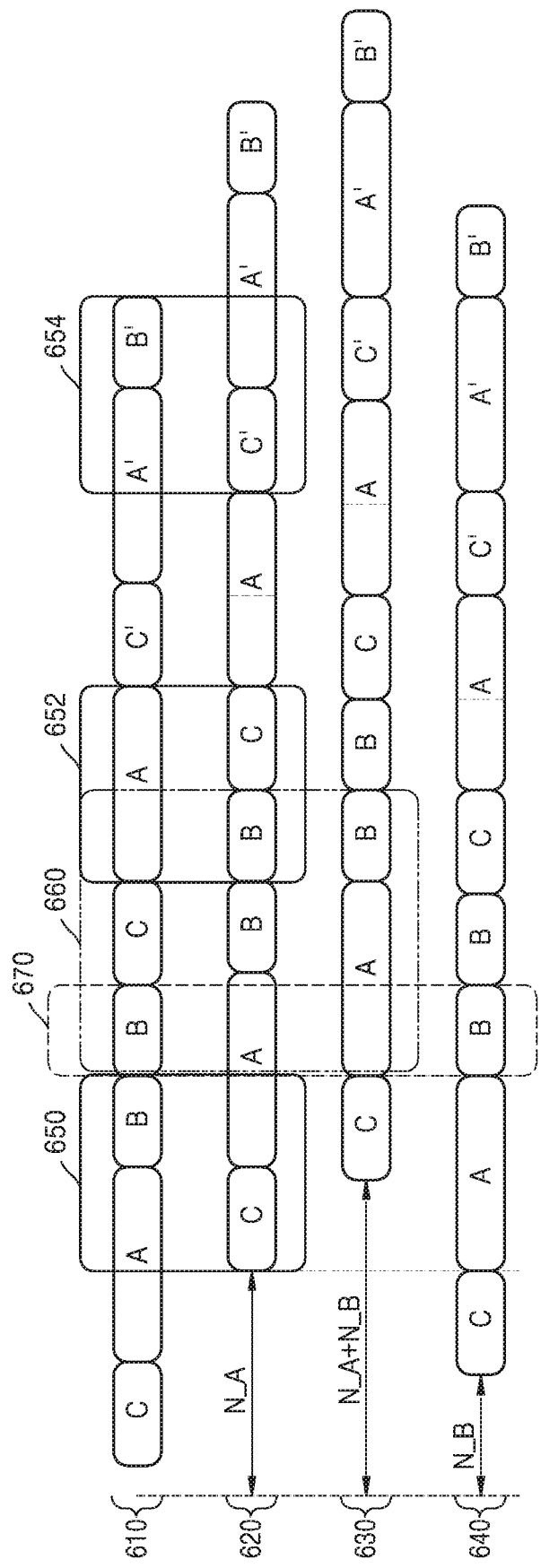
FIG. 6 illustrates delayed sequences of a preamble, which are generated by a preamble symbol detection apparatus, according to an embodiment.

FIG. 6 illustrates delayed sequences of a preamble, which are generated by a preamble symbol detection apparatus, according to an embodiment.

Referring to FIG. 6, a received preamble sequence 610 and three delayed sequences, for example, first, second, and third delayed sequences 620, 630, and 640 are shown. The first delayed sequence 620 is obtained by delaying the received preamble sequence 610 by N_A, the second delayed sequence 630 is obtained by delaying the received preamble sequence 610 by N_A+N_B, and the third delayed sequence 640 is obtained by delaying the received preamble sequence 610 by N_B.

According to an embodiment, the plurality of correlation values generated by the preamble symbol detection apparatus 500 of FIG. 5 described above may include a first correlation value generated by mutual-correlation between the first delayed sequence 620 and the received preamble sequence 610, a second correlation value generated by mutual-correlation between the second delayed sequence 630 and the received preamble sequence 610, and a third correlation value generated by mutual-correlation between the third delayed sequence 640 and the received preamble sequence 610.

Figure 7:
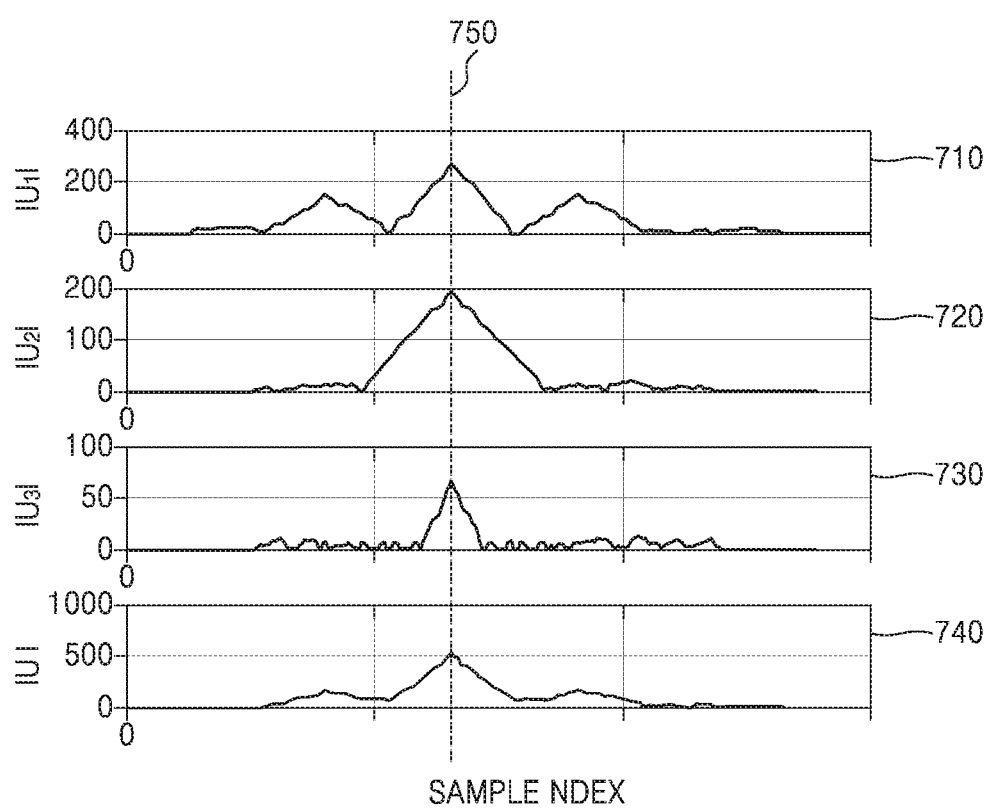
FIG. 7 illustrates correlation outputs of a preamble symbol detection apparatus, according to an embodiment.

According to an embodiment, a peak of the first correlation value may be formed in a $1\text{-}1^{st}$ section 650, a $1\text{-}2^{nd}$ section 652, and a $1\text{-}3^{rd}$ section 654, a peak of the second correlation value may be formed in a second section 660, and a peak of the third correlation value may be formed in a third section 670. According to an embodiment, the sections in which the peaks of the correlation values are formed may appear when samples of two sequences are same According to an embodiment, the preamble symbol detection apparatus 500 may form one maximum correlation peak by performing delay summation on the first to third correlation values. A result of the delay summation on the first to third correlation values is shown in FIG. 7 and is thus described below.

According to an embodiment, the preamble symbol detection apparatus 500 may perform synchronization by detecting a maximum correlation peak, compare the detected maximum correlation peak and a preset threshold, and when a valid signal is determined, complete signal detection. In this case, as a correlation gain between sequences is higher, a value of a maximum correlation peak may be higher, and as the value of the maximum correlation peak is higher, the signal detection and synchronization performance may be improved more. According to an embodiment, a correlation gain between sequences may be improved due to the structural characteristic of a preamble, which has been described with reference to FIG. 3.

Referring to FIG. 6, since the $1\text{-}1^{st}$ section 650, the $1\text{-}2^{nd}$ section 652, the $1\text{-}3^{rd}$ section 654, the second section 660, and the third section 670 in which the peaks of the correlation values are respectively formed are formed widely, a high correlation gain between sequences is observed. This high correlation gain may be caused by a cyclic postfix and cyclic prefix structure (i.e., a structure in which a symbol B corresponds to samples corresponding to a head portion of a symbol A, and a symbol C corresponds to samples corresponding to a tail portion of the symbol A). When both the symbol B and the symbol C are copied from the samples corresponding to the tail portion of the symbol A that is a main body sequence, the sections in which the peaks of the correlation values are respectively formed may be more narrowed than the $1\text{-}1^{st}$ section 650, the $1\text{-}2^{nd}$ section 652, the $1\text{-}3^{rd}$ section 654, the second section 660, and the third section 670 shown in FIG. 6.

According to an embodiment, in a preamble symbol, a symbol A' that is a main body sequence of a symbol P2 may have a different structure from that of a symbol A that is a main body sequence of a symbol P0 or P1. Accordingly, according to an embodiment, the preamble symbol detection apparatus 500 may also detect an additional correlation gain from the symbol P2.

According to an embodiment, in the preamble symbol, N_B/N_A and N_C/N_A values may be large. That is, a sample length of the symbol B compared with a sample length of the symbol A and a sample length of the symbol C compared with the sample length of the symbol A may be set large. In this case, a section in which samples of two mutually correlated sequences are same may be wide. Accordingly, according to an embodiment, the preamble symbol detection apparatus 500 may output a high correlation gain.

FIG. 7 illustrates correlation outputs of a preamble symbol detection apparatus, according to an embodiment.

Referring to FIG. 7, correlation peaks of correlation outputs 710, 720, 730, and 740 between two mutually correlated preamble symbols are shown. The correlation outputs 710, 720, 730, and 740 may be output from a delayed correlator in the preamble symbol detection apparatus.

For example, the correlation output 710 may indicate a correlation output between the received preamble sequence 610 and the first delayed sequence 620, the correlation output 720 may indicate a correlation output between the received preamble sequence 610 and the second delayed sequence 630, and the correlation output 730 may indicate a correlation output between the received preamble sequence 610 and the third delayed sequence 640. In addition, the correlation output 740 may indicate a maximum peak calculated by performing delayed summation on the correlation outputs 710, 720, and 730, and a location of a sample index 750 of the maximum peak.

A max-peak search algorithm may be used to search for a sample index corresponding to a maximum peak value of the correlation outputs 710, 720, and 730. The max-peak search algorithm stores maximum peak information and sample index information from the past to a current time point and, when a new maximum peak is detected, updates information regarding the detected new maximum peak. In this case, when a valid signal is detected in relation to a synchronization validation block, the maximum peak information and the sample index information are initialized.

According to an embodiment, the preamble symbol detection apparatus may detect, as an initial point of a signal, the sample index 750 corresponding to a maximum peak value retrieved through the max-peak search algorithm. Thereafter, the preamble symbol detection apparatus may process a subsequent data symbol based on the detected initial point of the signal.

Figure 8:
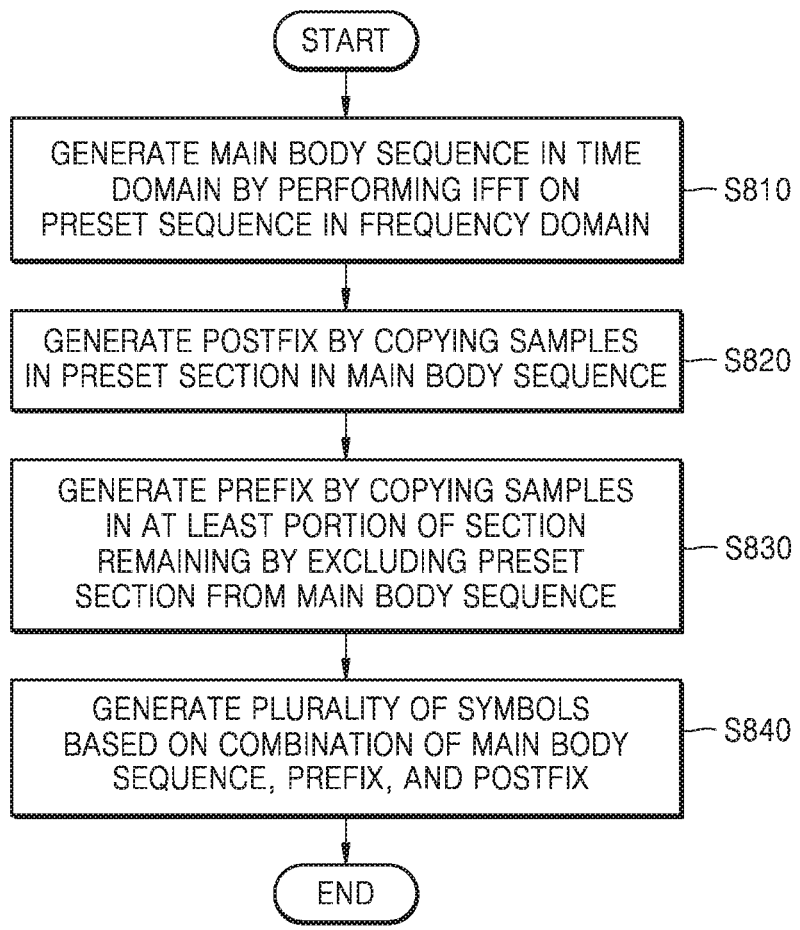
FIG. 8 is a flowchart of a preamble symbol generation method according to an embodiment.

FIG. 8 is a flowchart of a preamble symbol generation method according to an embodiment.

In operation S810, the preamble symbol generation apparatus 400 may generate a main body sequence in the time domain by performing an IFFT on a preset sequence in the frequency domain.

In operation S820, the preamble symbol generation apparatus 400 may generate a postfix by copying samples in a preset section in the main body sequence.

In operation S830, the preamble symbol generation apparatus 400 may generate a prefix by copying samples in at least a portion of a section remaining by excluding the preset section from the main body sequence.

In operation S840, the preamble symbol generation apparatus 400 may generate a plurality of symbols based on a combination of the main body sequence, the prefix, and the postfix.

Figure 9:
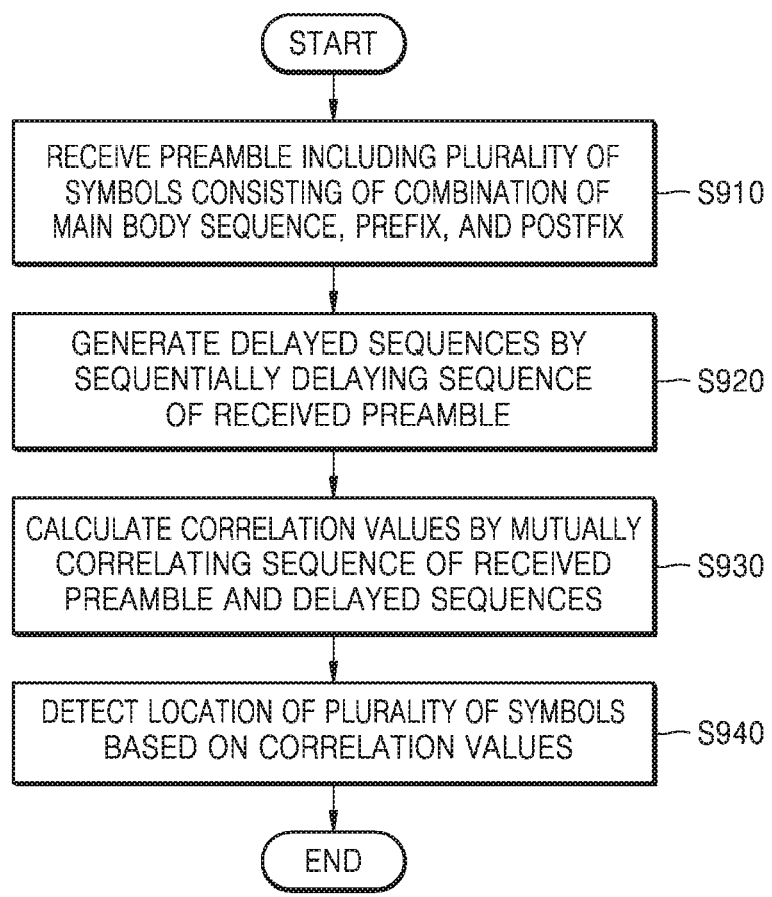
FIG. 9 is a flowchart of a preamble symbol detection method according to an embodiment.

FIG. 9 is a flowchart of a preamble symbol detection method according to an embodiment.

In operation S910, the preamble symbol detection apparatus 500 may receive a preamble including a plurality of symbols consisting of a combination of a main body sequence, a prefix, and a postfix.

In operation S920, the preamble symbol detection apparatus 500 may generate delayed sequences by sequentially delaying a sequence of the received preamble.

In operation S930, the preamble symbol detection apparatus 500 may calculate correlation values by mutually correlating the sequence of the received preamble and the delayed sequences.

In operation S940, the preamble symbol detection apparatus 500 may detect a location of a plurality of symbols based on the correlation values.

Figure 10:
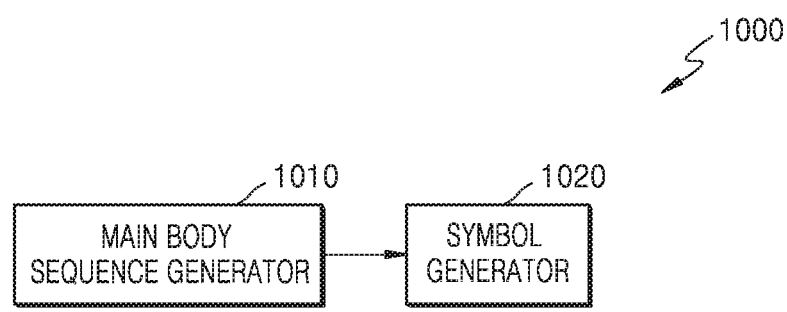
FIG. 10 is a block diagram of a preamble symbol generation apparatus according to an embodiment.

FIG. 10 is a block diagram of a preamble symbol generation apparatus 1000 according to an embodiment.

The preamble symbol generation apparatus 1000 according to an embodiment may include a main body sequence generator 1010 and a symbol generator 1020. The preamble symbol generation apparatus 1000 of FIG. 10 may correspond to the preamble symbol generation apparatus 400 of FIG. 4.

According to an embodiment, the main body sequence generator 1010 may generate a main body sequence in the time domain by performing an IFFT on a preset sequence in the frequency domain. An operation performed by the main body sequence generator 1010 according to an embodiment may correspond to an operation of generating the symbol A, which has been described above with reference to FIG. 4.

According to an embodiment, the symbol generator 1020 may generate postfix by copying samples in a preset section in the main body sequence, generate a prefix by copying samples in at least a portion of a section remaining by excluding the preset section from the main body sequence, and generate a plurality of symbols based on a combination of the main body sequence, the prefix, and the postfix.

A structure of the plurality of symbols generated by the symbol generator 1020 according to an embodiment may correspond to the preamble symbol structure described with reference to FIG. 3. That is, the preamble symbol structure generated by the symbol generator 1020 may be a cyclic postfix and cyclic prefix structure (i.e., a structure in which a symbol B corresponds to samples corresponding to a head portion of a symbol A, and a symbol C corresponds to samples corresponding to a tail portion of the symbol A). In addition, a symbol A' that is a main body sequence of a symbol P2 in a preamble symbol generated by the symbol generator 1020 may have a different structure from that of a symbol A that is a main body sequence of a symbol P0 or P1.

Figure 11:
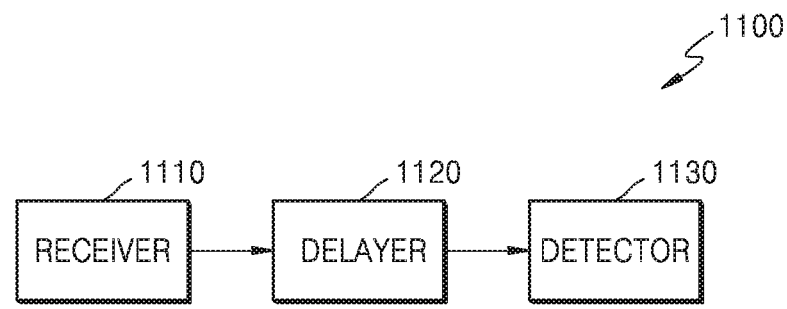
FIG. 11 is a block diagram of a preamble symbol detection apparatus according to an embodiment.

FIG. 11 is a block diagram of a preamble symbol detection apparatus 1100 according to an embodiment.

The preamble symbol detection apparatus 1100 according to an embodiment may include a receiver 1110, a delayer 1120, and a detector 1130. The preamble symbol detection apparatus 1100 of FIG. 11 may correspond to the preamble symbol detection apparatus 500 of FIG. 5.

According to an embodiment, the receiver 1110 may receive a preamble including a plurality of symbols consisting of a combination of a main body sequence, a prefix, and a postfix.

According to an embodiment, the delayer 1120 may generate delayed sequences by sequentially delaying a sequence of the received preamble.

According to an embodiment, the detector 1130 may calculate correlation values by mutually correlating the sequence of the received preamble and the delayed sequences and detect a location of a plurality of symbols based on the calculated correlation values. In this case, the detected plurality of symbols may conform to the preamble symbol structure described above with reference to FIG. 3.

Apparatuses according to the embodiments may include a processor, a memory for storing and executing program data, a permanent storage such as a disk drive, a communication port for communicating with an external device, and a user interface, such as a touch panel, a key, and a button. Methods implemented with a software module or an algorithm may be stored in a non-transitory computer-readable recording medium in the form of computer-readable codes or program commands executable in the processor. Examples of the non-transitory computer-readable recording medium include magnetic storage media (e.g., read-only memory (ROM), random-access memory (RAM), floppy disks, hard disks, etc.) and optical recording media (e.g., CD-ROMs, Digital Versatile Discs (DVDs), etc.). The non-transitory computer-readable recording medium can also be distributed over network coupled computer systems so that the computer-readable code is stored and executed in a distributed fashion. The media can be read by a computer, stored in the memory, and executed by the processor.

The present embodiments can be represented with functional blocks and various processing steps. These functional blocks can be implemented by various numbers of hardware and/or software configurations for executing specific functions. For example, the embodiments may adopt direct circuit configurations, such as memory, processing, logic, and look-up table, for executing various functions under control of one or more processors or by other control devices. Like components being able to execute the various functions with software programming or software elements, the present embodiments can be implemented by a programming or scripting language, such as C, C++, Java, or assembler, with various algorithms implemented by a combination of a data structure, processes, routines, and/or other programming components. Functional aspects can be implemented with algorithms executed in one or more processors. In addition, the present embodiments may adopt the prior art for electronic environment setup, signal processing and/or data processing. The terms, such as "mechanism", "element", "means", and "configuration", can be widely used and are not delimited as mechanical and physical configurations. The terms may include the meaning of a series of routines of software in association with a processor.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of generating a preamble symbol in an Orthogonal Frequency Division Multiplexing (OFDM) system, the method comprising:
generating a first main body sequence in a time domain by performing an inverse fast Fourier transform (IFFT) on a preset sequence in a frequency domain;
generating a first postfix by copying samples in a preset section in the first main body sequence;
generating a first prefix by copying samples in at least a portion of a section remaining by excluding the preset section from the first main body sequence; and
generating a plurality of OFDM symbols, based on a combination of the first main body sequence, the first prefix, and the first postfix,
wherein the plurality of OFDM symbols comprise a first OFDM symbol and a third OFDM symbol, and
wherein the first OFDM symbol comprises the first main body sequence and the third OFDM symbol comprises a second main body sequence that is different from the first main body sequence.

2. The method of claim 1, wherein the preset section corresponds to a section from an initial point of the first main body sequence to a preset point of the first main body sequence.

3. The method of claim 1, wherein a length of the first main body sequence and a sum of a length of the first prefix and a length of the first postfix are same.

4. The method of claim 1, wherein the plurality of OFDM symbols comprise a second OFDM symbol, and
wherein the second OFDM symbol comprises the first main body sequence.

5. The method of claim 4, wherein a sequence of the first OFDM symbol is configured in an order of the first prefix, the first main body sequence, and the first postfix,
a sequence of the second OFDM symbol is configured in an order of the first postfix, the first prefix, and the first main body sequence,
a sequence of the third OFDM symbol is configured in an order of a second prefix, the second main body sequence, and a second postfix, and
a length of the second prefix, a length of the second main body sequence, and a length of the second postfix respectively correspond to the length of the first prefix, the length of the first main body sequence, and the length of the first postfix.

6. The method of claim 1, wherein a length of the first main body sequence corresponds to a 128-fast Fourier transform (FFT) size.

7. The method of claim 1, wherein the plurality of OFDM symbols comprise a training symbol in which a plurality of sample signals are repeated.

8. A method of detecting a preamble symbol in an Orthogonal Frequency Division Multiplexing (OFDM) system, the method comprising:
receiving a preamble comprising a plurality of OFDM symbols generated based on a combination of a first main body sequence, a first prefix, and a first postfix;
generating delayed sequences by sequentially delaying a sequence of the received preamble;
calculating correlation values by mutually correlating the sequence of the received preamble and the delayed sequences; and
detecting a location of the plurality of OFDM symbols, based on the correlation values,
wherein the first postfix corresponds to samples in a preset section in the first main body sequence, and the first prefix corresponds to samples in at least a portion of a section remaining by excluding the preset section from the first main body sequence,
wherein the plurality of OFDM symbols comprise a first OFDM symbol and a third OFDM symbol, and
wherein the first OFDM symbol comprises the first main body sequence and the third OFDM symbol comprises a second main body sequence that is different from the first main body sequence.

9. The method of claim 8, wherein the preset section corresponds to a section from an initial point of the first main body sequence to a preset point of the first main body sequence.

10. The method of claim 8, wherein the generating the delayed sequences comprises:
generating a first delayed sequence by delaying the sequence of the received preamble by a length of the first main body sequence;
generating a second delayed sequence by delaying the sequence of the received preamble by a sum of the length of the first main body sequence and a length of the first postfix; and
generating a third delayed sequence by delaying the sequence of the received preamble by a length of the first postfix.

11. The method of claim 10, wherein the calculating the correlation values comprises calculating a plurality of correlation values by complex-conjugate-calculating each of the first delayed sequence, the second delayed sequence, and the third delayed sequence with the sequence of the received preamble and then applying a running average filter to a result of the complex-conjugate-calculating.

12. The method of claim 11, wherein the detecting the location of the plurality of OFDM symbols comprises:
forming a maximum correlation peak by performing delayed summation on the plurality of correlation values;
detecting an initial point of a frame from a time point where the maximum correlation peak exceeds a preset threshold; and
detecting the location of the plurality of OFDM symbols from a location of the maximum correlation peak.

13. The method of claim 8, wherein the plurality of OFDM symbols comprise a second OFDM symbol, and
wherein the second OFDM symbol comprises the first main body sequence.

14. The method of claim 13, wherein a sequence of the first OFDM symbol is configured in an order of the first prefix, the first main body sequence, and the first postfix,
a sequence of the second OFDM symbol is configured in an order of the first postfix, the first prefix, and the first main body sequence,
a sequence of the third OFDM symbol is configured in an order of a second prefix, the second main body sequence, and a second postfix, and
a length of the second prefix, a length of the second main body sequence, and a length of the second postfix respectively correspond to a length of the first prefix, a length of the first main body sequence, and a length of the first postfix.

15. An apparatus for generating a preamble symbol in an Orthogonal Frequency Division Multiplexing (OFDM) system, the apparatus comprising:
a main body sequence generator configured to generate a first main body sequence in a time domain by performing an inverse fast Fourier transform (IFFT) on a preset sequence in a frequency domain; and
a symbol generator configured to generate a first postfix by copying samples in a preset section in the first main body sequence, generate a first prefix by copying samples in at least a portion of a section remaining by excluding the preset section from the first main body sequence, and generate a plurality of OFDM symbols, based on a combination of the first main body sequence, the first prefix, and the first postfix,
wherein the plurality of OFDM symbols comprise a first OFDM symbol and a third OFDM symbol, and
wherein the first OFDM symbol comprises the first main body sequence and the third OFDM symbol comprises a second main body sequence that is different from the first main body sequence.

16. The apparatus of claim 15, wherein the preset section corresponds to a section from an initial point of the first main body sequence to a preset point of the first main body sequence.

17. A non-transitory computer-readable recording medium having recorded thereon a program, which when executed by a computer, performs the method in claim 1.

18. A non-transitory computer-readable recording medium having recorded thereon a program, which when executed by a computer, performs the method in claim 8.

* * * * *